(12) United States Patent
Mendelson et al.

(10) Patent No.: US 9,396,455 B2
(45) Date of Patent: Jul. 19, 2016

(54) SYSTEM, METHOD, AND SOFTWARE APPLICATION FOR ENABLING A USER TO VIEW AND INTERACT WITH A VISUAL MAP IN AN EXTERNAL APPLICATION

(75) Inventors: Neil S. Mendelson, Foster City, CA (US); William J. Creekbaum, San Mateo, CA (US); Andriy O. Mochalskyy, San Francisco, CA (US)

(73) Assignee: Mindjet LLC, San Francisco, CA (US)

( * ) Notice: Subject to any disclaimer, the term of this patent is extended or adjusted under 35 U.S.C. 154(b) by 1218 days.

(21) Appl. No.: 12/291,515

(22) Filed: Nov. 10, 2008

(65) Prior Publication Data

US 2010/0122151 A1   May 13, 2010

(51) Int. Cl.
*G06F 17/24* (2006.01)
*G06Q 10/10* (2012.01)
*G06F 17/30* (2006.01)

(52) U.S. Cl.
CPC .............. *G06Q 10/10* (2013.01); *G06F 17/24* (2013.01); *G06F 17/30241* (2013.01)

(58) Field of Classification Search
CPC . G06F 17/24; G06F 17/243; G06F 17/30241; G06F 21/6209; G06F 8/60; G06F 9/44521
USPC ......... 715/209, 210, 243, 248, 255, 760, 764, 715/769
See application file for complete search history.

(56) References Cited

U.S. PATENT DOCUMENTS

| | | |
|---|---|---|
| 5,257,185 A | 10/1993 | Farley et al. |
| 5,327,529 A | 7/1994 | Fults et al. |
| 5,341,223 A | 8/1994 | Shigeeda et al. |
| 5,546,529 A | 8/1996 | Bowers et al. |
| 5,548,749 A | 8/1996 | Kroenke et al. |
| 5,555,357 A | 9/1996 | Fernandes et al. |
| 5,597,312 A | 1/1997 | Bloom et al. |
| 5,619,694 A | 4/1997 | Shimazu |
| 5,627,979 A | 5/1997 | Chang et al. |

(Continued)

FOREIGN PATENT DOCUMENTS

| | | |
|---|---|---|
| EP | 0784263 | 7/1997 |
| EP | 1615145 | 1/2006 |

(Continued)

OTHER PUBLICATIONS

"Mindjet Manager 6—User's Guide", published: 2006, XP-002481035, pp. 4, 13, 15, 19, 36, 37, 99, 109, 147, 152, 153, 221, 250.*

(Continued)

*Primary Examiner* — Wilson Tsui
(74) *Attorney, Agent, or Firm* — Lessani Law Group, PC

(57) ABSTRACT

The present invention provides a system, method, and software program for enabling a user to view and interact with a visual map in an external application. According to one embodiment of the invention, a visual mapping application creates a file with (i) visual map data and (ii) software code capable of being executed by an external application to display the visual map and provide select visual mapping application in the external application. In one embodiment, such functionality includes the ability to expand and collapse map topics, scroll the map, zoom in and out, follow hypertext links in the map, find content in the map, and print the map. The created file can be thought of as a "visual map player" in that an external application can "play" the created file, resulting in a live map in the external application.

35 Claims, 9 Drawing Sheets

(56) References Cited

U.S. PATENT DOCUMENTS

| | | | |
|---|---|---|---|
| 5,787,417 A | 7/1998 | Hargrove | |
| 5,922,054 A * | 7/1999 | Bibayan | 719/328 |
| 5,948,040 A | 9/1999 | DeLorme et al. | |
| 5,956,708 A | 9/1999 | Dyko et al. | |
| 5,966,123 A | 10/1999 | Kaplan | |
| 6,037,944 A | 3/2000 | Hugh | |
| 6,121,971 A | 9/2000 | Berry et al. | |
| 6,148,311 A | 11/2000 | Wishnie et al. | |
| 6,175,830 B1 | 1/2001 | Maynard | |
| 6,182,065 B1 | 1/2001 | Yeomans | |
| 6,191,786 B1 | 2/2001 | Eyzaguirre et al. | |
| 6,212,526 B1 | 4/2001 | Chaudhuri et al. | |
| 6,377,287 B1 | 4/2002 | Hao et al. | |
| 6,405,225 B1 * | 6/2002 | Apfel et al. | 715/210 |
| 6,411,961 B1 | 6/2002 | Chen | |
| 6,418,426 B1 | 7/2002 | Schlesinger | |
| 6,434,556 B1 | 8/2002 | Levin et al. | |
| 6,496,208 B1 | 12/2002 | Bernhardt et al. | |
| 6,507,848 B1 * | 1/2003 | Crosby et al. | 715/200 |
| 6,628,312 B1 | 9/2003 | Rao et al. | |
| 6,738,964 B1 | 5/2004 | Zink et al. | |
| 6,813,531 B2 | 11/2004 | Coale et al. | |
| 6,961,910 B2 | 11/2005 | Lee et al. | |
| 7,080,092 B2 | 7/2006 | Upton | |
| 7,168,035 B1 | 1/2007 | Bell et al. | |
| 7,181,438 B1 | 2/2007 | Szabo | |
| 7,203,667 B2 | 4/2007 | Higgins et al. | |
| 7,313,766 B2 | 12/2007 | Kautto Kiovula et al. | |
| 7,415,672 B1 | 8/2008 | Fortini et al. | |
| 7,447,688 B2 | 11/2008 | Dietz et al. | |
| 7,543,299 B2 | 6/2009 | Goodman et al. | |
| 7,627,828 B1 | 12/2009 | Collison et al. | |
| 7,694,272 B2 | 4/2010 | Bronicki et al. | |
| 7,712,086 B2 * | 5/2010 | Hughes et al. | 717/131 |
| 7,770,180 B2 * | 8/2010 | Villaron et al. | 719/313 |
| 7,849,090 B2 | 12/2010 | Sweeney | |
| 7,962,433 B1 | 6/2011 | Heidenreich et al. | |
| 8,141,002 B2 | 3/2012 | Moses et al. | |
| 8,145,537 B2 | 3/2012 | Wehmann et al. | |
| 9,038,001 B2 | 5/2015 | Jetter et al. | |
| 9,047,388 B2 | 6/2015 | Creekbaum et al. | |
| 2002/0030703 A1 | 3/2002 | Robertson et al. | |
| 2002/0049689 A1 | 4/2002 | Venkatram | |
| 2002/0049750 A1 | 4/2002 | Venkatram | |
| 2002/0076025 A1 | 6/2002 | Liversidge et al. | |
| 2002/0186238 A1 | 12/2002 | Sylor et al. | |
| 2003/0004746 A1 | 1/2003 | Kheirolomoom et al. | |
| 2003/0033274 A1 | 2/2003 | Chow et al. | |
| 2003/0065650 A1 | 4/2003 | Annand et al. | |
| 2003/0083922 A1 | 5/2003 | Reed | |
| 2003/0110253 A1 | 6/2003 | Anuszczyk et al. | |
| 2003/0128239 A1 | 7/2003 | Angal et al. | |
| 2003/0137536 A1 | 7/2003 | Hugh | |
| 2003/0149681 A1 | 8/2003 | Frees et al. | |
| 2003/0154191 A1 | 8/2003 | Fish et al. | |
| 2003/0204487 A1 | 10/2003 | Sssv et al. | |
| 2003/0218640 A1 | 11/2003 | Noble-Thomas | |
| 2003/0233631 A1 | 12/2003 | Curry et al. | |
| 2003/0234808 A1 | 12/2003 | Huang et al. | |
| 2003/0237046 A1 | 12/2003 | Parker et al. | |
| 2004/0003033 A1 * | 1/2004 | Kamen et al. | 709/203 |
| 2004/0030741 A1 | 2/2004 | Wolton et al. | |
| 2004/0034706 A1 | 2/2004 | Cohen et al. | |
| 2004/0093328 A1 | 5/2004 | Damle | |
| 2004/0103071 A1 | 5/2004 | Kalia et al. | |
| 2004/0193588 A1 | 9/2004 | Tago et al. | |
| 2004/0219493 A1 | 11/2004 | Phillips | |
| 2004/0236625 A1 | 11/2004 | Kearon | |
| 2004/0254939 A1 | 12/2004 | Dettinger et al. | |
| 2004/0267753 A1 | 12/2004 | Hoche | |
| 2005/0038867 A1 | 2/2005 | Henderson et al. | |
| 2005/0054381 A1 | 3/2005 | Lee et al. | |
| 2005/0132305 A1 | 6/2005 | Guichard et al. | |
| 2005/0138160 A1 | 6/2005 | Klein et al. | |
| 2005/0147950 A1 | 7/2005 | Ortiz et al. | |
| 2005/0171746 A1 | 8/2005 | Thalhammer-Reyero | |
| 2006/0004845 A1 | 1/2006 | Kristiansen et al. | |
| 2006/0005164 A1 | 1/2006 | Jetter et al. | |
| 2006/0059135 A1 | 3/2006 | Palmon et al. | |
| 2006/0059143 A1 | 3/2006 | Palmon et al. | |
| 2006/0095474 A1 | 5/2006 | Mitra et al. | |
| 2006/0184886 A1 | 8/2006 | Chung et al. | |
| 2006/0285152 A1 * | 12/2006 | Skillen | 358/1.15 |
| 2007/0106974 A1 | 5/2007 | Chafe et al. | |
| 2007/0239680 A1 | 10/2007 | Oztekin et al. | |
| 2007/0266040 A1 | 11/2007 | Figlin | |
| 2008/0001948 A1 | 1/2008 | Hirsch | |
| 2008/0127169 A1 * | 5/2008 | Malasky et al. | 717/174 |
| 2008/0208885 A1 | 8/2008 | Barber et al. | |
| 2009/0119572 A1 | 5/2009 | Koivunen | |

FOREIGN PATENT DOCUMENTS

| | | |
|---|---|---|
| WO | 03/014965 | 2/2003 |
| WO | 2009075867 | 6/2009 |

OTHER PUBLICATIONS

Librelotto et al., Extreme Markup Languages 2007, Montreal, Quebec, Aug. 7-10, 2007, pp. 1-15.

Lu, Yiling, Roadmap for tool support for collaborative ontology engineering, University of Victoria, 2003, pp. 1-119.

Spanger, S., et al., "Mindmap: Utilizing Multiple Taxonomies and Visualization to Understand a Document Collection," Proceedings of the 35th Annual Hawaii International, 2001.

MindManager 2002 HelpFile, Mindjet LLC 2002, pp. 1, 9-12, 17, 22-23, 26, 35, 41, 46-47, 57, 61-66, 75-78, 82-84, 91, 105, 152, 157, 166, 178, 180-183, and 190, from URL: http://www.mindjet.com/pdf_eng/MM2002_Help_File_pdf.

Sumner, T., et al., "A Web Service Interface for Creating Concept Browsing Interfaces" D-Lib Magazine, Nov. 2004 vol. 10, No. 11, Nov. 2004, XP002580529 ISSN: 1082-9873.

"ThinkGraph: Introduction", Feb. 4, 2007. URL: http://www.thinkgraph.com.

Dokumentation zum Lernprogramm Mindmapping mit Freemind, Dec. 1, 2007, p. 63. URL: http://www.portal.schule.bremen.de/dokumente/loadzip/65760_v_0/projects/doc/lernmaterialfreemind.pdf.

PCT International Search Report in related PCT Application No. PCT/2009/005972.

PCT International Preliminary Examination Report in related PCT Application No. PCT/2009/005972.

Jelinek, Jodef, et al., "XML Visualization Using Tree Rewriting," Proceedings of the 20th Spring Conference on Computer Graphics, Apr. 22, 2004, Slovakia, XP002444098.

Delahousse, J., "Index and knowledge drawing: a natural bridge from Topic Maps to XML SVG", In Proceedings of XML USA 2001, Orlando, Dec. 2001.

Drechsel, Uwe, "VYM—View Your Mind (Version 1.12.0)" Internet Citation Jun. 23, 2008, p. 35 pp.

Kolas, L., "Topics Maps in E-Learning: An Ontology Ensuring an Active Student Role as Producer", Proceedings of World Conference on E-Learning in Corporate, Government, Healthcare, and Higher Education 2006, pp. 2107-2113.

Leissler, Martin, et al., "Automatic Updates of Interactive Information Visualization User Interfaces Supporting Multimedia Information Retrieval through Database Triggers", May 10, 2000, pp. 1-11.

\* cited by examiner

SYSTEM, METHOD, AND SOFTWARE APPLICATION FOR ENABLING A USER TO VIEW AND INTERACT WITH A VISUAL MAP IN AN EXTERNAL APPLICATION

BACKGROUND OF THE INVENTION

1. Field of the Invention

This invention relates generally to visual mapping systems, and, more particularly, to enabling a user to view and interact with a visual map in an external application.

2. Description of the Background Art

A visual map is a diagram that represents ideas and/or information in topics. Examples of visual maps are mind maps, topic maps, semantic networks, and concept maps. Visual maps are increasingly used to help people generate, classify, and/or organize ideas and information and to see such ideas and information in a hierarchical, visual layout. Visual maps are used for project management, work-flow analysis, organizational charts, and other purposes.

FIG. 1 is an example of a visual map for information related to a wireless communication project meeting. The visual map in FIG. 1 is a mind map. Mind maps are made up of hierarchically-arranged topics. The main topics in FIG. 1 are "Action Items", "Purpose", "Agenda", "Time Place", "Participants", and "Purpose." Each of these topics has subtopics. For instance, "Implementation" is a subtopic for "Action Items," and "Carry out Launch" is a subtopic of "Implementation." Users typically create topics in a visual map by inserting or importing text and graphic elements into topics.

Users typically create visual maps using proprietary visual mapping software. Mindjet LLC'S MINDMANGER® software is an example of such software.

One limitation users of visual maps currently face is that in order for a user to share a visual map with other users, the other users have to have visual mapping software capable of opening and interacting with the visual map. While current technology allows visual maps to be saved as PDF files, such files are static files. A user viewing the PDF file is not able to interact with the map (e.g., expand and collapse topics).

Therefore, there is a desire to be able to share visual maps with users that do not have a proprietary visual mapping application, where the recipients of the map can interact with the visual map using an external application (i.e., a non-visual mapping application). For example, it would be desirable to enable a user to view and interact with a map in PDF file or in a web browser.

SUMMARY

The present invention provides a system, method, and software program for enabling a user to view and interact with a visual map in an external application. According to one embodiment of the invention, a visual mapping application (executing on a computer) receives a request to create a visual map file that can be executed within an external application. The visual mapping application then retrieves the applicable visual map data. Such visual map data may be obtained from a map stored by the visual mapping application, or it may be obtained from an external source, such as a web service. The visual mapping application creates a file that includes both the visual map data and software code with visual mapping application functionality.

The software code in the created file is capable of being executed in an external application to display the visual map and provide select visual mapping functionality. The created file can be thought of as a "visual map player" in that an external application can "play" the created file, resulting in a live map in the external application. The ways in which a user can interact with the visual mapping application can vary greatly and depend on the functionality built into the software code included in the created file. In the preferred embodiment, such functionality includes the ability to expand and collapse map topics, scroll the map, zoom in and out, follow hypertext links in the map, find content in the map, and print the map. Other types of functionality that can be built into the created file include the ability to edit a visual map, including adding, deleting, and moving topics.

In an alternate embodiment of the invention, the created file does not include all the visual map data necessary to display the visual map. Instead it includes a link to a network address from which visual map data can be obtained, such as a network address associated with a web service or a visual mapping server. This enables the created file to obtain the most recent version of the visual map without altering the created file.

In another alternate embodiment, the created file includes an application programming interface to the external application. The external application generates visual map data and initializes the created file with the visual map data. Software code in the created file displays the data in a visual map within the external application.

DETAILED DESCRIPTION OF THE PREFERRED EMBODIMENTS

The present invention provides a system and method for enabling a user to view and interact with a visual map in an external application. As used herein, an external application is any application that is not a visual mapping application. A visual mapping application, such as Mindjet LLC's MIND-MANAGER, is an application specifically designed to provide visual mapping functionality. Examples of external applications include PDF applications (e.g., ADOBE ACROBAT), word processing applications (e.g., MICROSOFT WORD), spreadsheet applications (e.g., MICROSOFT EXCEL), slide presentation applications (e.g., MICROSOFT POWERPOINT), computer-aided drawing applications (e.g., MICROSOFT VISIO), and web browsers.

Figure 1:
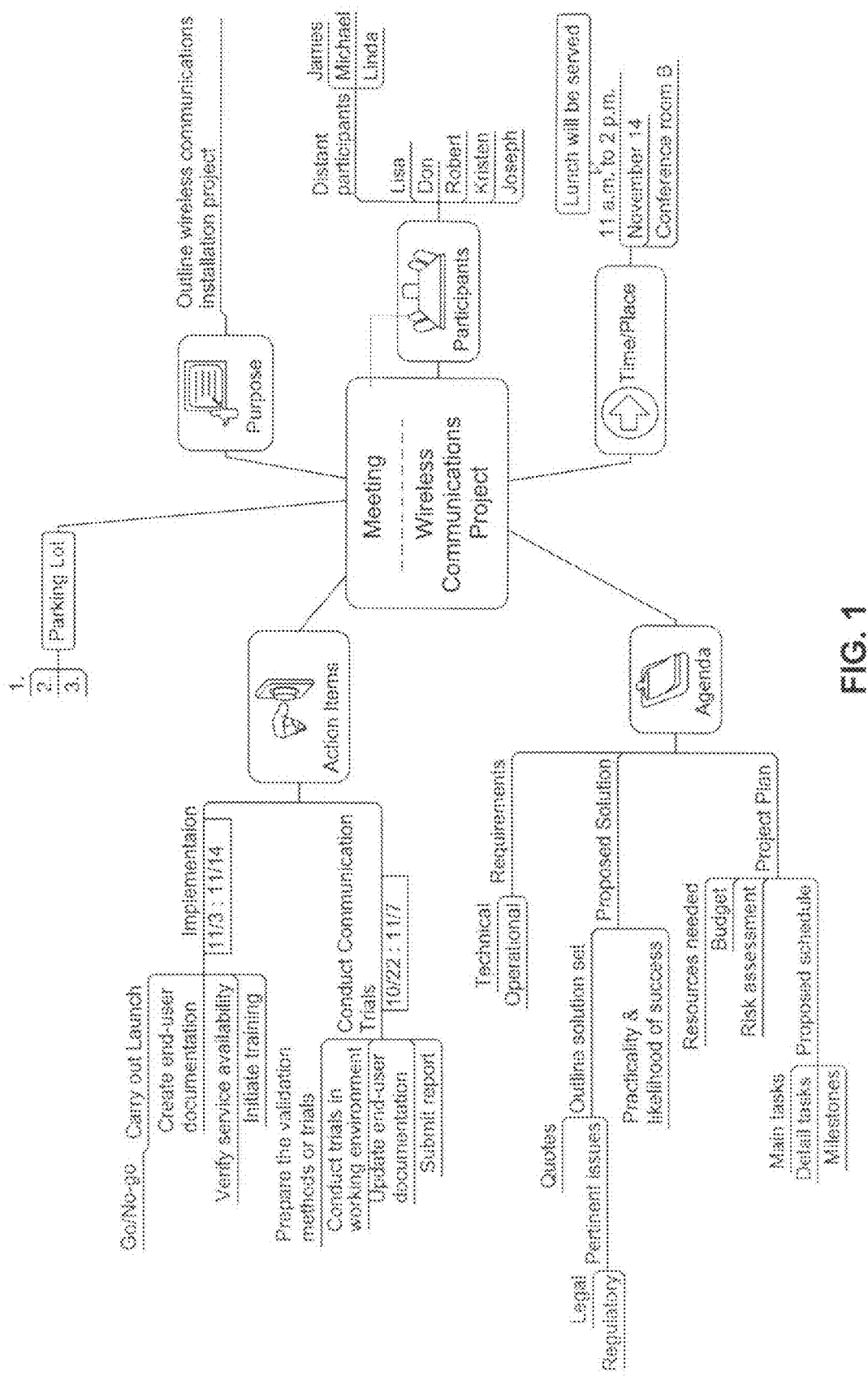
FIG. 1 is an example of a mind map.
Figure 2:
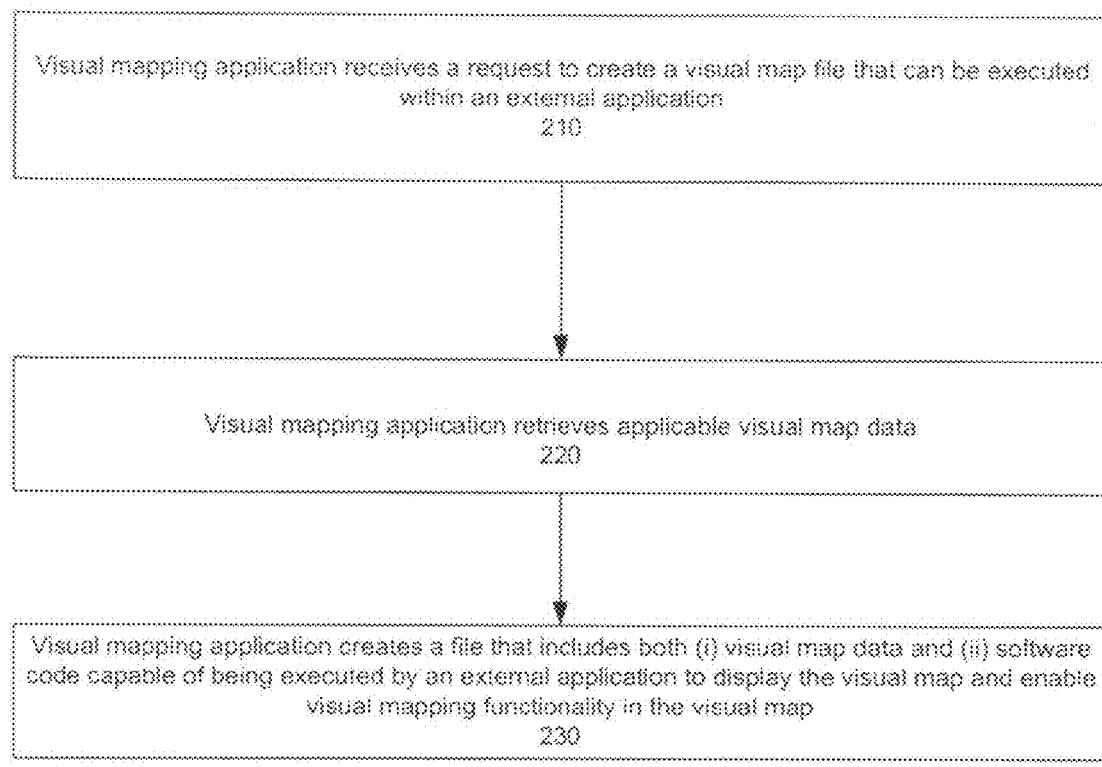
FIG. 2 is a flowchart that illustrates a method, according to one embodiment of the present invention, for enabling a visual map to be viewed and interacted with in an external application.

FIG. 2 illustrates a method for enabling a visual map to be viewed and interacted with in an external application. According to such method, a visual mapping application receives a request to create a map file that can be executed within an external application (step 210). Such request may be initiated by a user of the visual mapping application, or may be a request from another software application. The visual mapping application then retrieves the applicable visual map data (step 220), and creates a file that includes both the visual map data and software code with visual mapping application functionality (step 230).

The software code in the created file is capable of being executed in an external application to display the visual map and provide select visual mapping functionality. The created file can be thought of as a "visual map player" in that an external application can "play" the created file, resulting in a "live" (i.e., non-static) map in the external application. Consequently, the created file is referred to herein as a "player file." The ways in which a user can interact with the visual mapping application can vary greatly and depend on the functionality built into the software code included in the player file. In the preferred embodiment, such functionality includes the ability to expand and collapse map topics, scroll the map, zoom in and out, follow hypertext links in the map, find content in the map, and print the map. Other types of functionality that can be built into the player file include the ability to edit a visual map, including adding, deleting, and moving topics.

Figure 3:
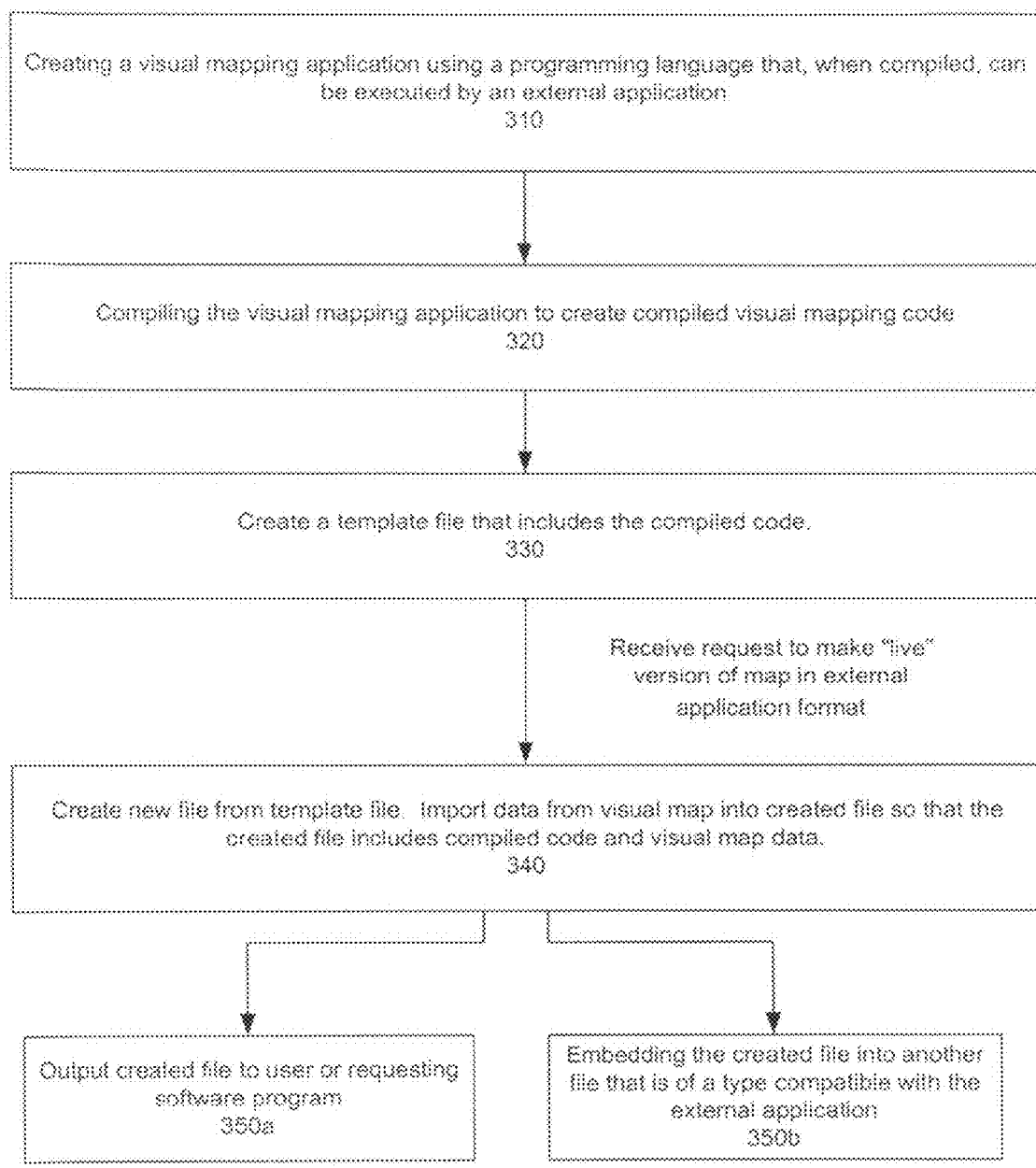
FIG. 3 is a flowchart that illustrates an example of one way in which the method of FIG. 2 can be implemented.

FIG. 3 illustrates an example of one way in which the method of FIG. 2 can be implemented. In such example, a software developer writes visual mapping software code in a programming language that, when compiled, can be executed by the host external application (step 310). The visual mapping code has the ability to display a visual map and perform select, additional visual mapping functions. In one embodiment, the additional visual mapping functionality is the ability to expand and collapse map topics, scroll the map, zoom in and out, follow hypertext links in the map, find content in the map, and print the map. In the preferred embodiment, the visual mapping code created by the software developer is a "mini" or stripped-down version of a fully functional visual mapping application, such as Mindjet LLC's MINDMANAGER.

The software developer compiles the visual mapping code (320) and creates a template file that includes the compiled code (330). The template file includes a space for visual map data. Such space is referred to herein as the "data payload." The compiled code will act upon map data stored in the data payload.

In response to the visual mapping application receiving a request (from either a user or other software application) to make a live version of a visual map in an external application format, the visual mapping application creates a new file (i.e., a player file) from the template file (step 340). Specifically, it makes a copy of the template file and imports data for such visual map into the data payload of the newly-created player file.

The visual mapping application then either (i) makes the player file available to a user or requesting software program (step 350a) or (ii) embeds the player file into a file type that is compatible with the external application, and makes the latter file available to a user or requesting software program (step 350b). For example, if the external application is a web browser, the player file may be embedded in a web page (e.g., an html file). If the external application is a PDF player, then the player file may be embedded in a PDF file. The player file also can be embedded in other types of files, such as word processing documents (e.g., .doc or .docx files), spreadsheet documents (e.g., .xls or .xlsx files), slide presentations (e.g., .ppt files), and generic computer automated files (e.g., .vsd files).

In an alternate embodiment, the method of FIG. 2, as well as steps 340-350a-b in FIG. 3, need not be performed by a visual mapping application. In other words, another type of application can perform these steps, as long as such application has access to visual mapping code that it (such application) can insert into a player file.

Figure 4:
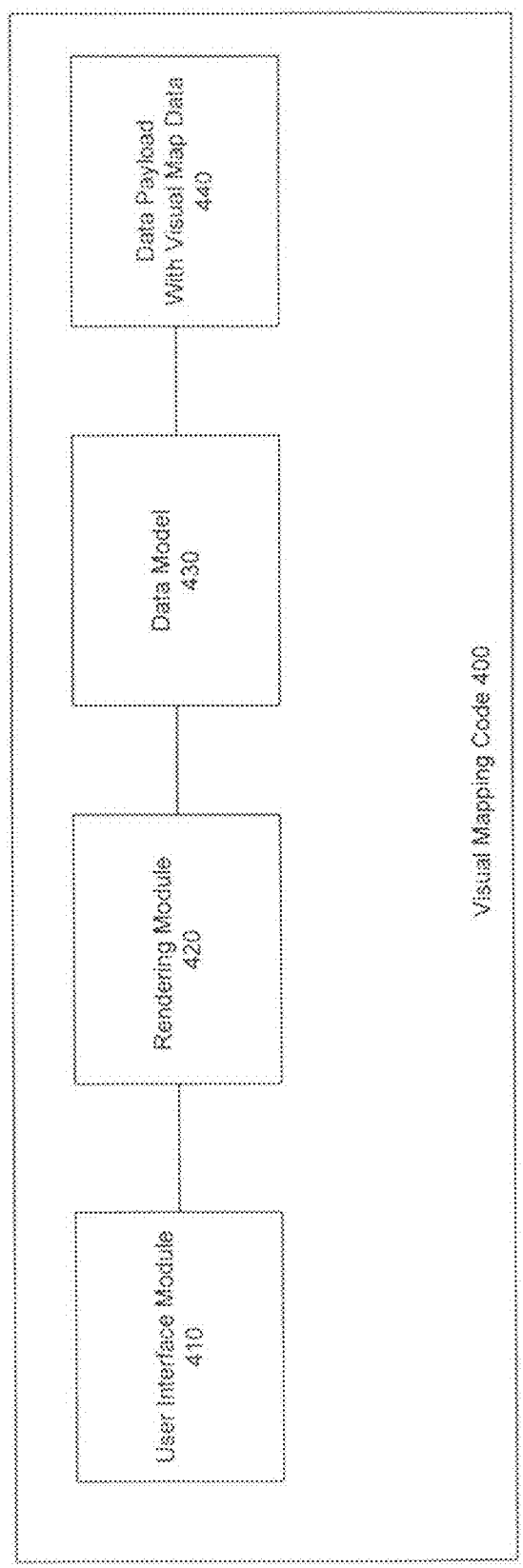
FIG. 4 is a block diagram that illustrates an example software architecture.

FIG. 4 illustrates an example architecture for the software code developed in step 310 for the player file. FIG. 4 is intended to be only an example, and the invention is not limited to the architecture displayed in FIG. 4.

In FIG. 4, the visual mapping code 400 includes a User Interface Module 410, a Rendering Module 420, a Data Module 430, and a Data Payload section 440. Visual map data is a loaded into the Data Payload Section 440. When the visual mapping code 400 is executed, the Data Module 440 specifies how data in the Data Payload 440 is translated into a visual map. The Rendering Module 420 is responsible for displaying the map (in accordance with the Data Module 440) within the external application. The User Interface Module 410 enables the user to interface with the visual map. For example, if a user clicks on a branch in the map to expand or collapse it, the User Interface Module provides such information to the Rendering Module which adjusts the map display accordingly.

In one embodiment, the visual mapping code in the player file is written in a software language that enables features such as animation and vector graphics. In the preferred embodiment, the visual mapping code 400 is written using ADOBE FLEX libraries and ADOBE ACTIONSCRIPT software language. In such embodiment, the player file created after the visual mapping code 400 is compiled is a SWF file. A SWF file can be executed by many types of external applications, including PDF players and web browsers. In alternate embodiment, the visual mapping code 400 is written using MICROSOFT SILVERLIGHT or Moonlight, which is an open source implementation of MICROSOFT SILVERLIGHT. In another alternate embodiment, the visual mapping code is written using Ajax (Asynchronous JavaScript and XML).

Figure 5:
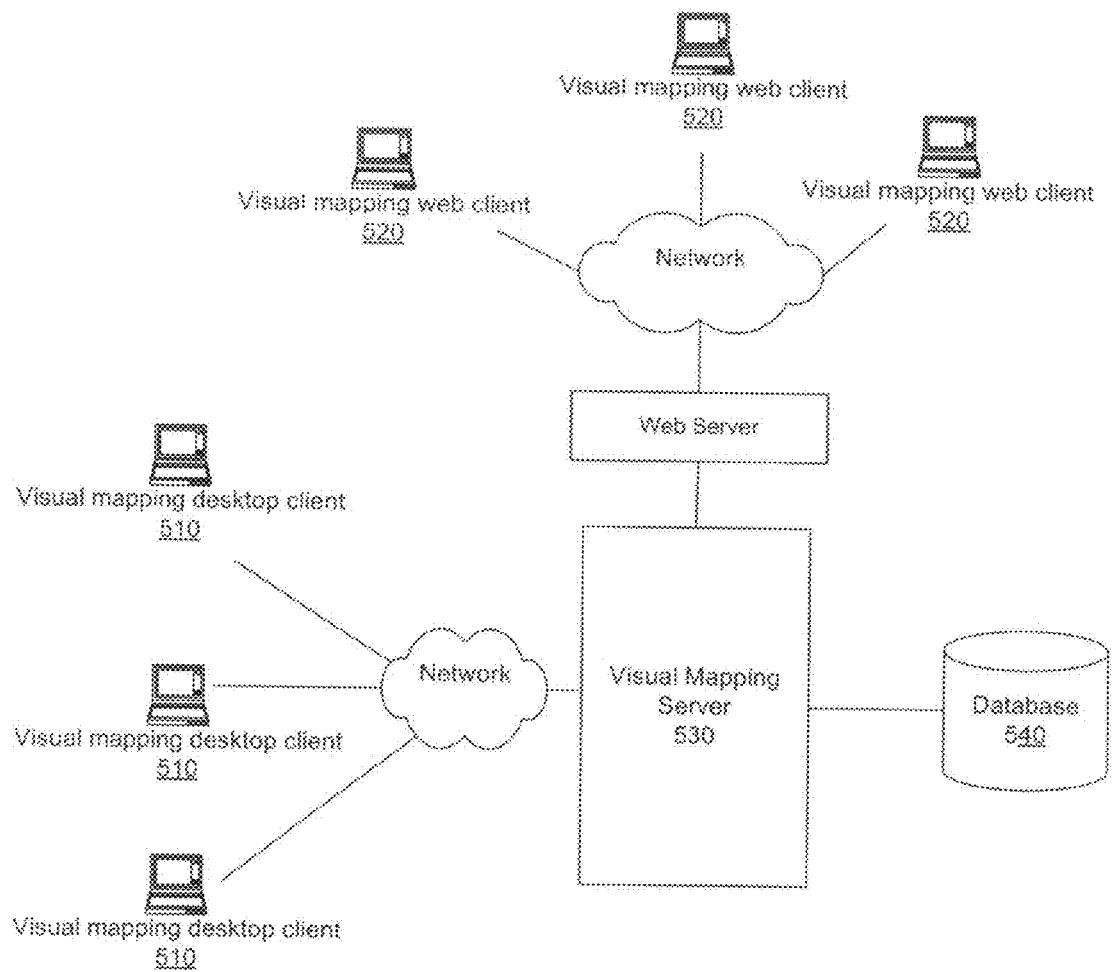
FIG. 5 is a block diagram that illustrates an example visual mapping system.

FIG. 5 illustrates an example of a visual mapping system 500 in which the present invention can be implemented. Visual mapping system 500 is only an example, and the invention is not limited to this example.

In system 500, a user can create visual map from a visual mapping desktop client 510 or a visual mapping web client 520. These visual mapping clients 510, 520 are served by a visual mapping server 530. Mindjet LLC's MINDJET CONNECT is an example of a visual mapping server application. After a user creates or edits a visual map, the visual mapping client (510 or 520) sends the map data to the visual mapping server 530, which stores the data in a file system or a database 540. A visual map can be stored as a file, or the topics in a map can be stored in individually in a database, as described in U.S. patent application Ser. No. 12/001,533 titled "System and Method for Enabling a User to Search and Retrieve Individual Topics in a Visual Mapping System," which was filed on Dec. 12, 2007 and which is incorporated by reference as if fully disclosed herein.

In system 500, the template file with the visual mapping code referenced in FIGS. 2 and 3 is stored in a file system/database 540. When a user wants to create a player file, the user's visual mapping client 510 informs the visual mapping server 530 of the user's request. The visual mapping server 530 creates the player file, based on the template file, with the visual mapping code and the visual map data. The mapping server sends the visual mapping client 510/520 the player file, either by itself or as part of another file (such as a web page or PDF document).

Figure 6:
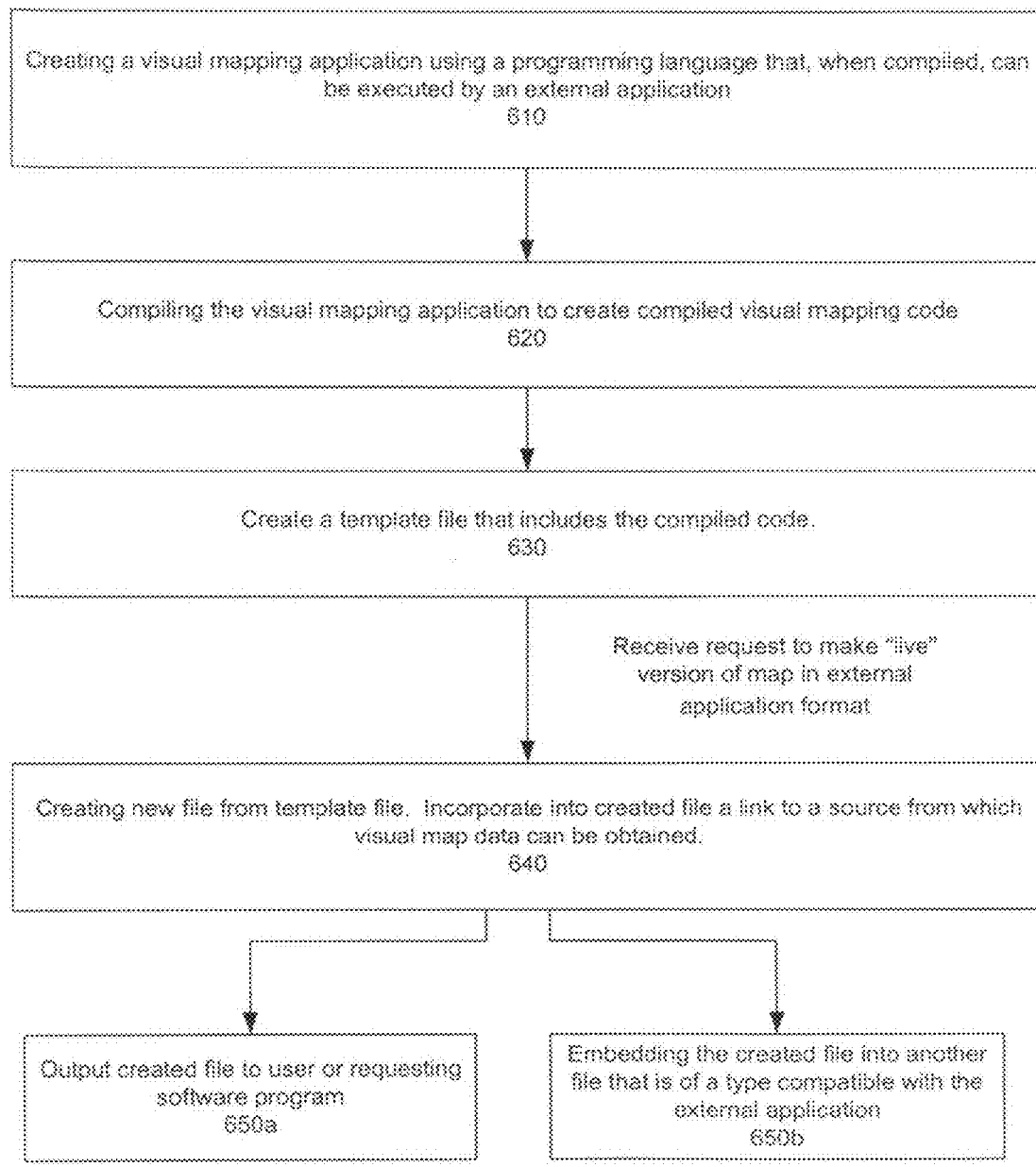
FIG. 6 is a flowchart that illustrates a method, according to an alternate embodiment of the present invention, for enabling a visual map to be viewed and interacted with in an external application.

FIG. 6 illustrates an alternate embodiment of the present invention. In the flow chart in FIG. 6, steps 610-630 and 650 are the same as steps 310-330 and 350. However, in step 640, instead of embedding all the visual map data into the player file, a link to visual map data (i.e., a network address) is embedded into the player file. The link can be a link to a published map or to a data service that dynamically generates visual map data from data obtained from a data source (e.g., a web search engine, a web server, a database, etc.). This enables the player file to obtain the most recent version of the visual map without altering the player file.

In one embodiment, the player file includes a link to a web service associated with a search domain (i.e., GOOGLE, YAHOO, etc.). The visual mapping functionality within such player file enables a user to enter search terms into the visual map displayed by the player file in the external application. After a user enters search term, the software code in the player file makes a call to the web service with the search terms and subsequently receives search results from the web service. The software code in the player file then display the search results in a visual map. A method for searching within visual maps is described in more detail in U.S. Patent Application titled "System, Method, and Software Application for Enabling a User to Search an External Domain within a Visual Mapping Interface," having inventors William J. Creekbaum, Michael B. Jetter, and Steven Bashford, and filed on Nov. 10, 2008, the contents of which are incorporated by reference as if fully disclosed herein. Also, a method for displaying data from a web service in a visual map is described in U.S. Patent Application titled "System, Method, and Software Application for Displaying Data from a Web Service in a Visual Map," having inventors William J. Creekbaum, Michael B. Jetter, and Steven Bashford, and filed on Nov. 10, 2008.

Figure 7:
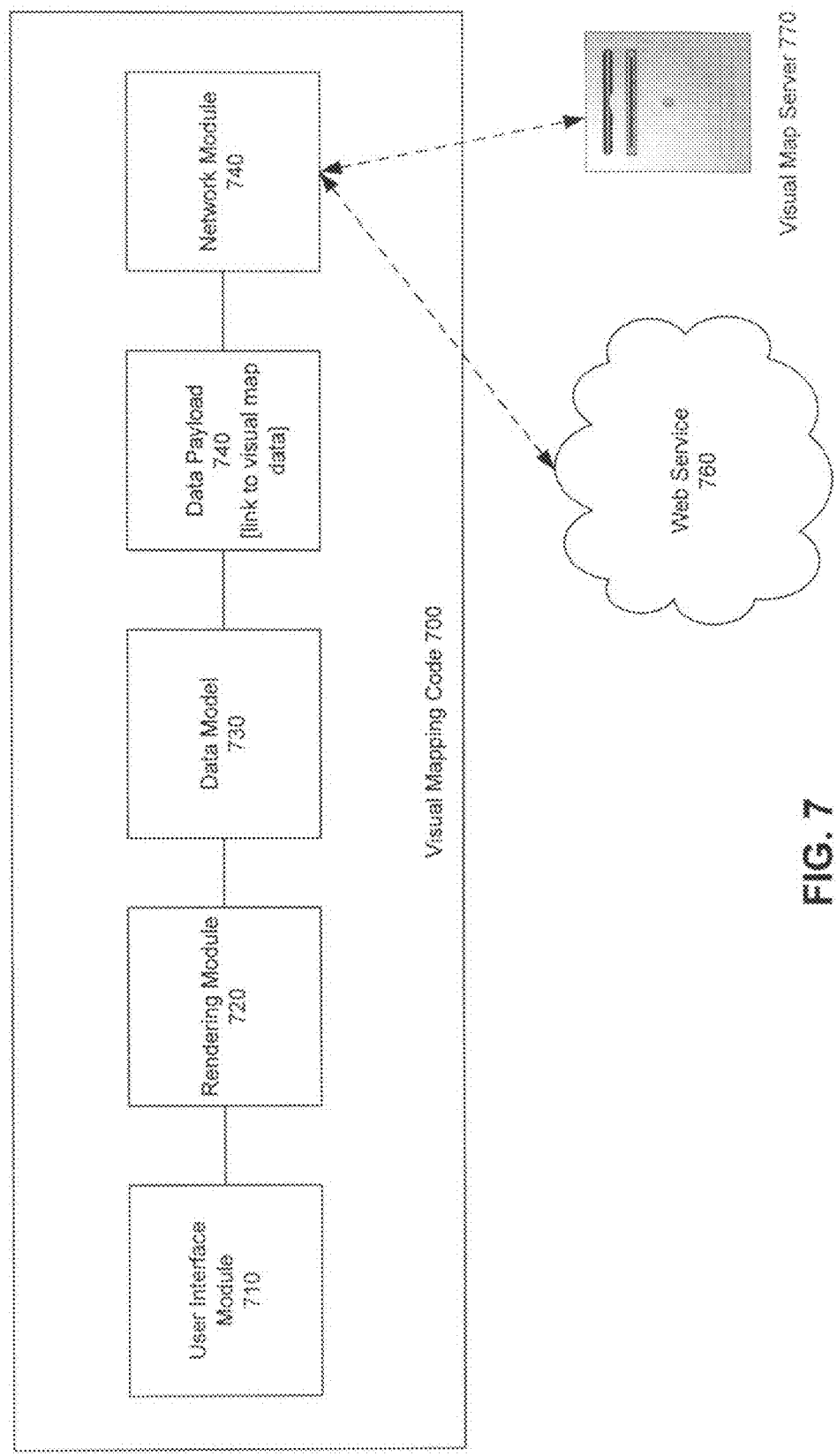
FIG. 7 is a block diagram that illustrates an example software architecture associated with such alternate embodiment.

FIG. 7 illustrates an example software architecture for visual mapping code in the player file in accordance with this alternate embodiment. Like the visual mapping code in FIG. 4, visual mapping code 700 has a User Interface Module 710, a Rendering Module 720, and a Data Model 730, a Data Payload section 740. In addition, the visual mapping code 700 includes a Network Module 750. The Network Module 750 has the ability to communicate with a network, such as the Internet. The Data Payload section 740 includes a link to a network address from which visual map data can be obtained. For example, the link can be a link to a visual map on a visual map server 770 or a web service 760. The map can be a published map or one that is dynamically generated by a web service or a visual map server.

When the player file is run within the external application, the Network Module 750 retrieves the link from the Data Payload section 740 and requests visual map data from a service/service at the link. When the Network Module 750 receives the requested visual map data from the server/service at the link, it loads such data into the Data Payload section 740. In the preferred embodiment, the visual map data returned by the web service or a visual mapping server is in XML format, although the invention is not limited to XML format. Other text-based formats can be used (e.g., JSON), as well as proprietary binary formats.

Figure 8:
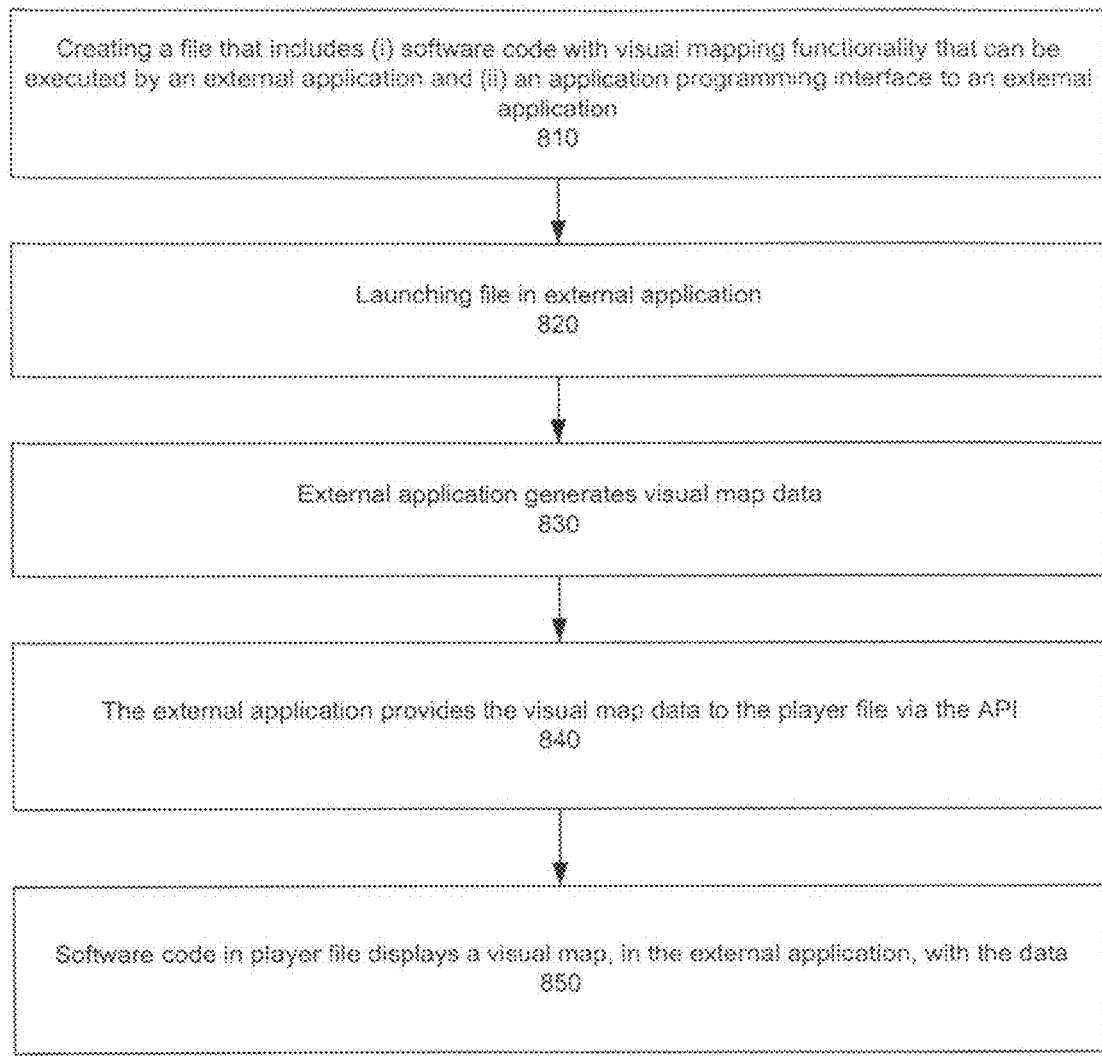
FIG. 8 is a flowchart that illustrates a method, according to another alternate embodiment of the present invention, for enabling a visual map to be viewed and interacted with in an external application.

In another alternate embodiment of the invention, the external application generates visual map data and inserts the data into a player file. This embodiment is described with respect to FIGS. 8 and 9. Referring to FIG. 8, this embodiment involves creating a file (a player file) that includes (i) software code with visual mapping functionality that can be executed by an external application and (ii) an application programming interface (API) to an external application (step 810). The player file is subsequently launched in the external application (step 820), and the external application generates visual map data for the player file (830). Via the API, the external application provides the visual map data to the player file (840), and the software code in the player file displays a visual map, in the external application, with the data (850). The external application may provide visual map data to the player file only upon launching the player file, or, alternately, it may continuously, frequently, periodically, or occasionally update the visual map data while the player file is open within the external application. For example, if the external application provides the player file with stock quotes, the external application may continuously update the visual map with new stock quotes while the applicable stock market is open.

Figure 9:
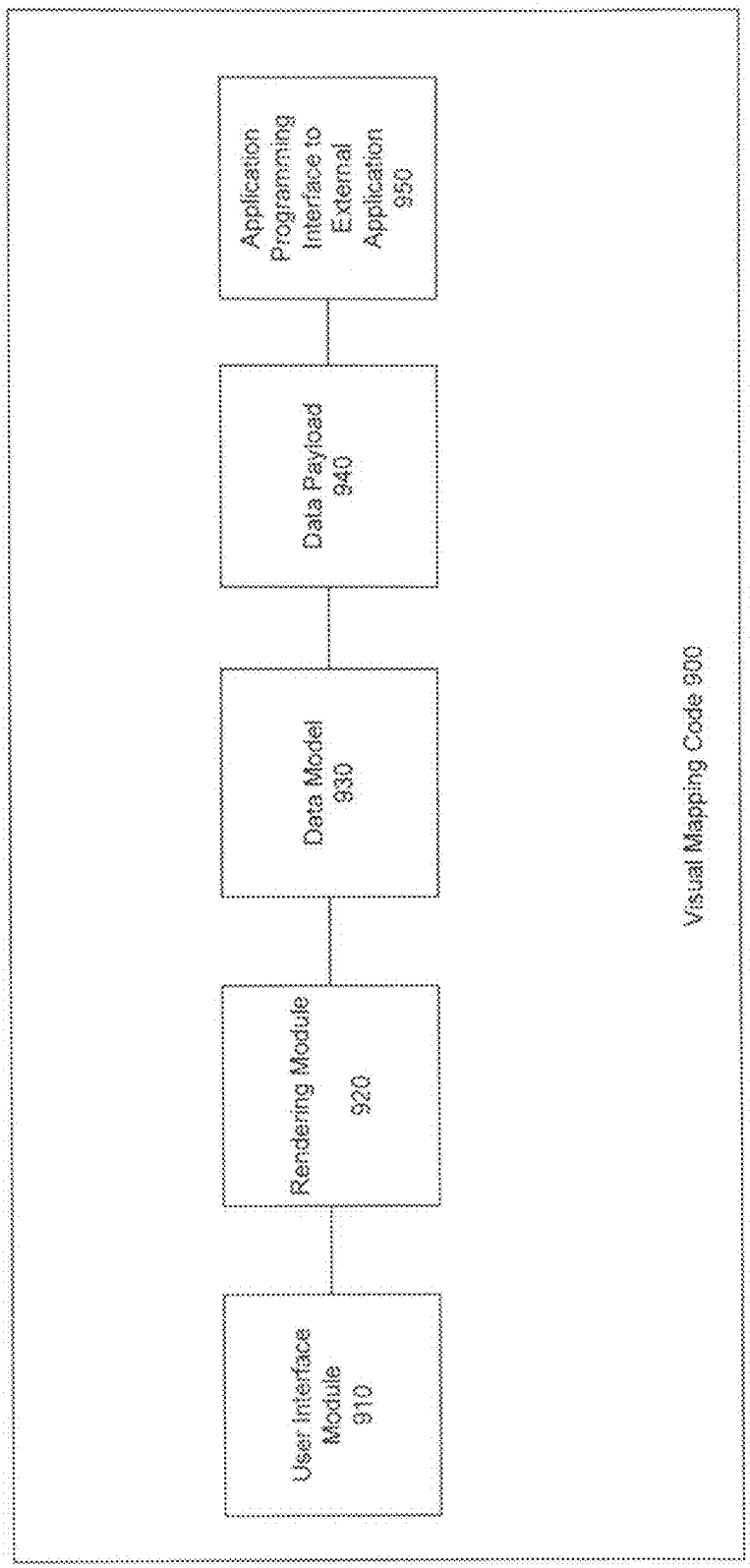
FIG. 9 is a block diagram that illustrates an example software architecture associated with such other alternate embodiment.

FIG. 9 illustrates an example of software architecture for visual mapping code (in the player file) in accordance with this embodiment. This embodiment is not limited to this example.

Like the visual mapping code in FIG. 4, visual mapping code 900 has a User Interface Module 910, a Rendering Module 920, and a Data Model 930, a Data Payload section 940. In addition, the visual mapping code 900 includes an Application Programming Interface (API) 950 that interfaces with the external application. The external application initiates the player file by sending visual mapping data to the API 950. The API 950 loads visual map data into the Data Payload module 940.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method on a computer for enabling a user to view and interact with a visual map in an external application, the method comprising:
   receiving a request in a visual mapping application to create a visual map file that can be executed within an external application, the visual mapping application having visual mapping functionality including editing functionality for a user to edit visual map data and store the edited visual map data;
   in response to receiving the request in the visual mapping application to create a visual map file that can be executed within an external application, performing the following steps:
   retrieving visual map data, including any stored edits to the visual map data, wherein the visual map data is retrieved by the visual mapping application; and
   creating a file in the visual mapping application, wherein the created file includes (i) the retrieved visual map data and (ii) software code capable of being executed by the external application to display the visual map and enable at least a subset of the same visual mapping functionality as the visual mapping application within the external application, wherein the visual mapping functionality includes the editing functionality for editing the visual map.

2. The method of claim 1, wherein the method further comprises embedding the created file into another file that is of a type compatible with the external application.

3. The method of claim 2, wherein the external application is a web browser and the created file is embedded into a web page.

4. The method of claim 2, wherein the external application is a PDF player and the created file is embedded into a PDF file.

5. The method of claim 2, wherein the external application is a word processing application, and the created file is embedded into a word processing document.

6. The method of claim 2, wherein the external application is an application that enables a user to create and play slide presentations, and the created file is embedded into a slide presentation file.

7. The method of claim 1, wherein the visual mapping functionality includes the ability to expand and collapse topics in the visual map, change a zoom factor of the visual map, follow hypertext links in the visual map, and print the visual map.

8. A method of claim 1, wherein the retrieved visual map data was created in the visual mapping application.

9. The method of claim 1, wherein the retrieved visual map data was retrieved by the visual mapping application from an external source.

10. A method on a computer for enabling a user to view and interact with a visual map in an external application, the method comprising:
  creating a file, using a visual mapping application, that can be executed by an external application, the visual mapping application having visual mapping functionality including editing functionality for a user to edit visual map data and store the edited visual map data; and
  inserting data related to a visual map, including any stored edits to the visual map data, into the created file;
  wherein the created file, when executed by an external application, is able to display the visual map and provide a user with at least a subset of the same visual mapping functionality as the visual mapping application within the external application, wherein the visual mapping functionality includes the editing functionality for editing the visual map.

11. The method of claim 10, wherein the method further comprises embedding the created file into another file that is of a type compatible with the external application.

12. The method of claim 11, wherein the external application is a web browser and the created file is embedded into a web page.

13. The method of claim 11, wherein the external application is a PDF player and the created file is embedded into a PDF file.

14. The method of claim 11, wherein the external application is a word processing application, and the created file is embedded into a word processing document.

15. The method of claim 11, wherein the external application is an application that enables a user to create and play slide presentations, and the created file is embedded into a slide presentation file.

16. The method of claim 10, wherein the data related to a visual map includes all the data necessary to display the visual map.

17. The method of claim 10, wherein the data related to a visual map is a link to a network address from which visual map data can be obtained.

18. The method of claim 17, wherein the link is a link to a published visual map available on a web service.

19. The method of claim 17, wherein the network address is a web service and the link includes information used by the web service to dynamically generate visual map data from a data source.

20. The method of claim 10, wherein the visual mapping functionality includes the ability to expand and collapse topics in the visual map, change a zoom factor of the visual map, follow hypertext links in the visual map, and print the visual map.

21. The method of claim 10, wherein the created file is embedded within an external application prior to the inserting step, and wherein the external application generates visual map data and performs the inserting step.

22. A method on a computer for enabling a user to view and interact with a visual map in an external application, the method comprising:
  creating using a visual mapping application a target visual mapping application by using visual mapping code written in a programming language that, when compiled, can be executed by an external application, the visual mapping application having visual mapping functionality including editing functionality for a user to edit visual map data and store the edited visual map data;
  compiling the visual mapping code to create compiled visual mapping code of the target visual mapping application;
  creating a template file that includes the compiled visual mapping code; and
  importing data related to a visual map, including any stored edits to the visual map data, into the template file to create a file that includes such data and the compiled visual mapping code, wherein, the created file, when executed by an external application, is able to display the visual map and operate on the visual map at least a subset of the same visual mapping functions as the visual mapping application within the external application, wherein the visual mapping functions include editing functions for editing the visual map.

23. The method of claim 22, wherein the method further comprises embedding the created file into another file that is of a type compatible with the external application.

24. The method of claim 22, wherein the data related to a visual map includes all the data necessary to display the visual map.

25. The method of claim 22, wherein the data related to a visual map is a link to a network address from which visual map data can be obtained.

26. The method of claim 25, wherein the link is a link to a published visual map available on a web service.

27. The method of claim 25, wherein the network address is a web service and the link includes information used by the web service to dynamically generate visual map data from a data source.

28. The method of claim 22, wherein the visual mapping functions include the ability to expand and collapse topics in the visual map, change a zoom factor of the visual map, follow hypertext links in the visual map, and print the visual map.

29. A computer program embodied on a non-transitory computer-readable medium and comprising code, that, when executed by a computer, enables the computer to perform the following method:
  creating a file using a visual mapping application that can be executed by a non-visual mapping application, the visual mapping application having visual mapping functionality including editing functionality for a user to edit visual map data and store the edited visual map data; and inserting data related to a visual map, including any stored edits to the visual map data, into the created file;

wherein the created file, when executed by a non-visual mapping application, is able to display the visual map and provide a user with at least a subset of the same visual mapping functionality as the visual mapping application within the non-visual mapping application, wherein the visual mapping functionality includes the editing functionality for editing the visual map.

30. The computer program of claim 29, wherein the method further comprises embedding the created file into another file that is of a type compatible with the non-visual mapping application.

31. The computer program of claim 29, wherein the data related to a visual map includes all the data necessary to display the visual map.

32. The computer program of claim 29, wherein the data related to a visual map is a link to a network address from which visual map data can be obtained.

33. The computer program of claim 32, wherein the link is a link to a published visual map available on the web service.

34. The computer program of claim 32, wherein the network address is a web service and the link includes information used by the web service to dynamically generate visual map data from a data source.

35. The computer program of claim 29, wherein the visual mapping functionality includes the ability to expand and collapse topics in the visual map, change a zoom factor of the visual map, follow hypertext links in the visual map, and print the visual map.

* * * * *